United States Patent
Bernier

(10) Patent No.: US 6,664,656 B2
(45) Date of Patent: Dec. 16, 2003

(54) AIRCRAFT ELECTRICAL POWER DISTRIBUTION NETWORK

(75) Inventor: Alan T. Bernier, Woodinville, WA (US)

(73) Assignee: The Boeing Company, Seattle, WA (US)

( * ) Notice: Subject to any disclaimer, the term of this patent is extended or adjusted under 35 U.S.C. 154(b) by 145 days.

(21) Appl. No.: 09/951,583

(22) Filed: Sep. 11, 2001

(65) Prior Publication Data

US 2003/0047997 A1 Mar. 13, 2003

Related U.S. Application Data

(60) Provisional application No. 60/232,368, filed on Sep. 14, 2000.

(51) Int. Cl.$^7$ .................................................. B60L 1/00
(52) U.S. Cl. .................... 307/9.1; 244/60; 244/75 R; 244/76 R; 701/3; 307/64
(58) Field of Search .............................. 307/64, 18, 23, 307/80, 9.1, 20, 34, 42, 84, 86; 244/194, 76 R, 53 R, 60, 227, 75 R; 701/3

(56) References Cited

U.S. PATENT DOCUMENTS

| | | | |
|---|---|---|---|
| 3,908,935 A | * | 9/1975 | Heintz ........................ 244/227 |
| 4,144,551 A | | 3/1979 | Smith et al. ................... 361/93 |
| 4,422,180 A | | 12/1983 | Wendt |
| 4,551,632 A | * | 11/1985 | Jourdan et al. ............... 307/9.1 |
| 5,493,497 A | * | 2/1996 | Buus .............................. 701/4 |
| 5,570,002 A | | 10/1996 | Castleman ................... 323/283 |
| 5,936,318 A | | 8/1999 | Weiler et al. |
| 6,046,513 A | | 4/2000 | Jouper et al. .................. 307/31 |

FOREIGN PATENT DOCUMENTS

| | | |
|---|---|---|
| EP | 1099630 | 5/2001 |
| FR | 2786326 | 5/2000 |

OTHER PUBLICATIONS

Todd, J.R. et al.: "Integrating fly–by–light/power–by–wire flight control systems on transport aircraft", Digital Avionics Systems Conference, 1993, 12$^{th}$ DASC., AIAA/IEE, Oct. 1993, pp. 457–462, XP010117028 Fort Worth, TX, USA, paragraph: "Integration of fly–by–light/power–by–wire flight control systems"; figure 4.

Luis J. Feiner: "Power–/by–wire aircraft secondary power systems", Digital Avionics Systems Conference, 1993, 12$^{th}$ DASC, Oct. 1993, pp. 439–444, XP010117031, Fort Worth, TX, USA, paragraphs: "Abstract", "Introduction", "Power by Wire Expected Benefits", "Integrated Power/Data Infrastructure"; figures 6, 7.

* cited by examiner

Primary Examiner—Shawn Riley
(74) Attorney, Agent, or Firm—Conrad O. Gardner

(57) ABSTRACT

A data collection network and electrical power distribution network designed to reduce airplane wire weight and allow nearly complete wiring design and installation of wiring and equipment in the major structural sections of the airplane.

5 Claims, 5 Drawing Sheets

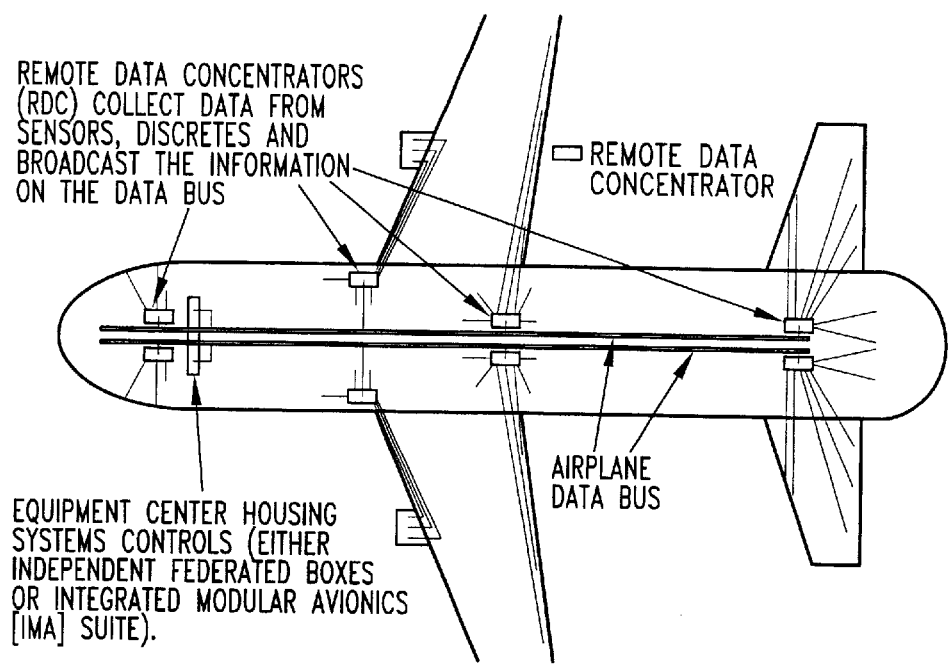
(Prior Art) Fig. 3
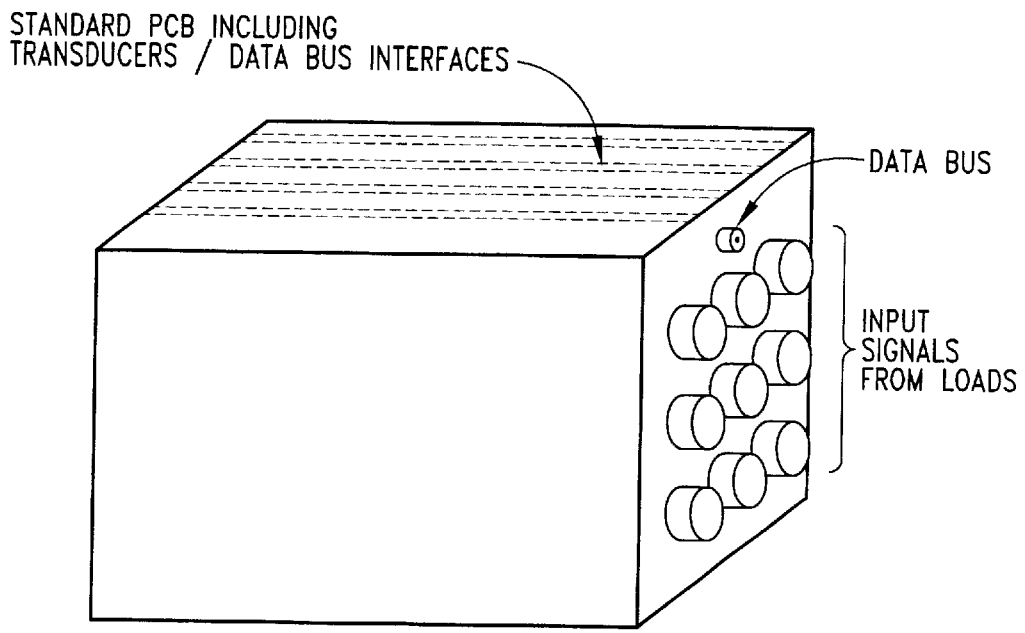
Fig. 4

AIRCRAFT ELECTRICAL POWER DISTRIBUTION NETWORK

CROSS-REFERENCE TO RELATED APPLICATIONS

This application claims priority from Provisional Application Ser. No. 60/232,368, filed Sep. 14, 2000, abandoned.

FIELD OF THE INVENTION

The present invention relates to a new data collection network and electrical power distribution network designed to reduce airplane wire weight and allow nearly complete wiring design and installation of wiring and equipment at the major structural levels.

BACKGROUND OF THE INVENTION

A conventional aircraft distribution system is depicted in FIG. 1. Electrical power from engine mounted generators is fed to a main power distribution panel (PDP), generally in a forward E/E bay, which is co-located with the system controllers. Electrical power is then distributed from these Main power distribution panels to all the load equipment in the aircraft. Data sources are hardwired from sensors all around the aircraft to the System controllers in the E/E bay. Load control signals are hardwired from system controllers in the E/E bay to the individual loads that need to be controlled. This system results in large complex wire bundles which run the length of the airplane in some cases.

SUMMARY OF THE INVENTION

This invention is aimed at saving distribution engineering and fabrication costs by standardizing several new or modified Electrical components and putting them together in a fashion which allows different model airplanes to use the same components connected to common electrical sources and data buses. The system uses software files to control individual configuration variations of one model and variations from model to model.

BRIEF DESCRIPTION OF THE DRAWINGS

FIG. 3 shows the Remote Data Concentrator Network;

FIG. 4 is illustrative of RDCs;

DETAILED DESCRIPTION OF THE INVENTION

A new data collection network and electrical power distribution network designed to reduce airplane wire weight and allow nearly complete wiring design and installation of wiring and equipment at the major structural levels (Section 41, 43, 45, etc.). Reducing wire runs across major aircraft structural sections would allow the airplane wiring build to be simplified. Manufacturing and maintenance costs would be reduced.

System Distribution Architecture

Figure 2:
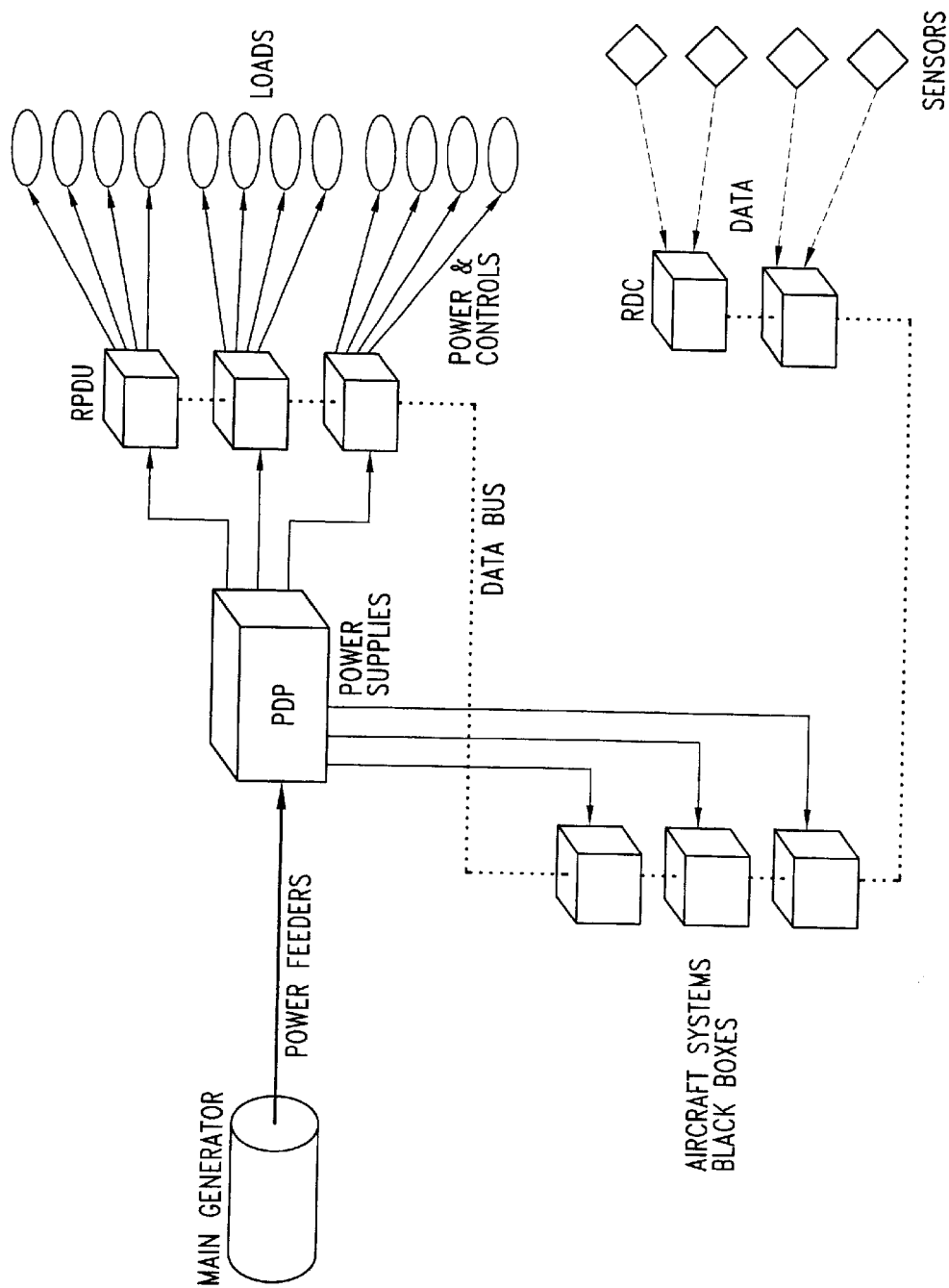
FIG. 2 is illustrative of system distribution architecture.

An aircraft electrical power/data distribution designed to minimize and simplify electrical wiring on aircraft and it's installation effort. The architecture is shown in FIG. 2. The system can be subdivided into a data collection network and an electrical power distribution network.

The data collection system utilizes remote data concentrators (RDC), which collect data from geographic areas of the aircraft and transmit that information on a bus for use by various system controllers on the aircraft. Electrical power on the aircraft is transmitted from engine generators to centrally located Main Power Distribution Panels. Secondary feeders distribute the electrical power to small Remote Power Distribution Units (RPDU) which contain solid state power controllers and can be remotely turned off and on in response to data bus commands from the system controllers. A big advantage is the savings in wire weight due to not having to bring sensor data all the way to the system control and not having to distribute all the loads from a single distribution point in the aircraft. By locating these remote data collectors and distribution units geographically close to their source/destinations the aircraft wiring can be greatly simplified and built as part of the aircraft structural sections with mainly power feeds and data bus wiring going across structural joins.

System Configuration

FIG. 3 depicts the Remote Data Concentrator network. The network consists of RDCs's which are located about the aircraft geographically close to the data sources (sensors, discretes, transducers etc.). The sensor data is digitized and broadcast on to a system data bus to be used by any other system. Lightning protection is minimized due to the reduced wire lengths from the sensors in lightning strike areas to the RDC's. The RDC's are geographically close to the sensors they are connected to. Sensor information wiring need no longer be run all the way from the sensors to the system controllers. The savings in wire weight, wire bundle size and associated manufacturing complexity can be realized whether federated system controllers are utilized or an Integrated Modular Avionics (IMA) rack concept is used. A notional RDC is depicted in FIG. 4. All RDC's could be identical and unique addresses of their data established through exterior program pinning of an RDC.

Figure 5:
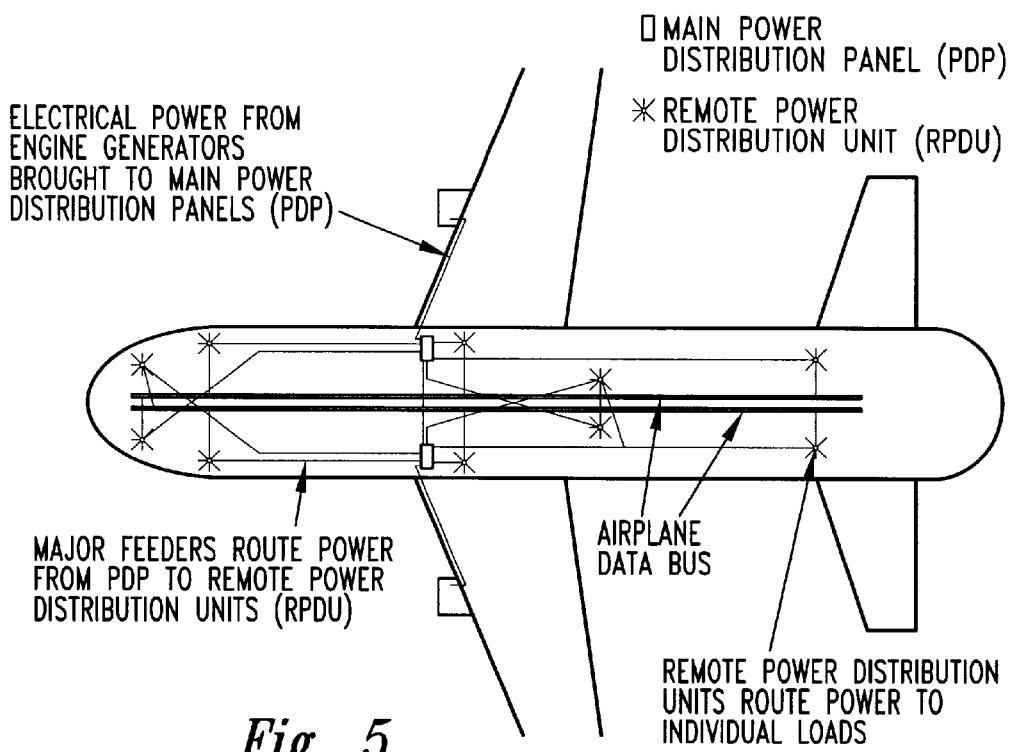
FIG. 5 shows the electrical power distribution network.

FIG. 5. illustrates the electrical power distribution network. The electrical power distribution network consists of centrally located Power Distribution Panels (PDP), Remote Power Distribution Units (RPDU), and a Circuit Breaker Control and Status (CBCS) display. All of these units are connected to a high-speed data bus from which system/ manual control commands are received/executed.

The Power Distribution Panels are located centrally in the airplane and distribute electrical power to remotely located RPDU's which are geographically located around the airplane in close proximity to the electrical load equipment. A Power distribution panel(shown in FIG. 6) would contain the Main Generator breakers and primary Distribution Buses. They would ideally be located within the pressurized fuselage near the leading edge of the wings to reduce the length of the engine generator feeders. There would be one power distribution panel for each engine generator channel. Each Power Distribution Panel would consist of: Main generator control breakers, Bus Tie Breakers, Bus bar network and controllable Distribution breakers to feed electrical power to Remote Power Distribution Units. The PDP's would be connected to a high-speed data bus network to receive control commands and transmit status. All PDP's would be identical and there would be one PDP for each independent channel within the airplane. The airplane channel identifier would be established by programming pin within the airplane wiring connecting to the PDP. All PDPs across the NAPD family could utilize a single part number with minimal weight penalty to a lower capacity member of the family. PDPs would have unique airplane load equipment tables loaded into NVM memory for a particular channel such that all load circuit breaker connectivity information needed by RPDUs would be read by the RPDU at the time the units were powered up.

Remote Power Distribution Units receive power from the Main PDPs and distribute power to individual load equipment. RPDUs are placed in the airplane geographically close to the load equipment they control and supply. An RPDU (shown in FIG. 7) would be a shoe box sized unit consisting of several circuit cards. Most of the circuit cards would have several Solid State Power Controllers (SSPC) mounted on the card. Two cards would be for redundant data bus communication and SSPC control with respect to data bus commands. SSPC's would offer conventional circuit wire protection, arc fault protection, and additionally would provide load on/off control in response to system commands via the databus. Remote trip reset and circuit "collaring" could also be accomplished by data bus command. As the same SSPC package can handle a range of currents, a higher capacity device would be standard and the devices would be programmed by download of circuit information for a RPDU in a certain geographic location. The RPDUs require no active cooling. An RPDU would be automatically reconfigured for an individual SSPC failure such that device failure would not result in flight delays and maintenance could be accomplished at the first convenient maintenance opportunity. Each RPDU will be powered from one electrical bus (Left Main, Right Main, etc.). This will simplify electrical separation requirements. The RPDU will be in communication to the system by data bus so that electrical power will be connected or removed from the individual loads as commanded from the system controller. By locating the RPDU near the load, aircraft wiring will be minimized. RPDUs would be located in each of the major airplane sections. More RPDUs would be located where there is a higher concentration of loads. This could minimize the wiring being routed across major aircraft sections to: power feeders supplying the RPDUs and the data bus wiring. All RPDUs would be identical, and there would be as many RPDUs in each electrical channel as required to supply all load equipment for that channel. The RPDUs would have common part numbers across the NAPD family The CBCS (FIG. 8) is a display unit located in the Electronics bay with another unit possible located in the airplane cockpit. The function of this unit will be to review circuit breaker status (Open, Closed, Tripped), to remotely set tripped circuits and to remotely de-power and collar electronic circuit breakers for maintenance purposes such as remove and replacing load equipment. The cockpit unit would be used to provide status/reset capability to some set of loads, which are deemed to need to be reset in the event of a trip in flight. On the ground they would provide the same interface as the unit located in the electronics bay. For dispatch purposes one could call up a page to verify that all breakers were engaged and circuit protection was operative or that certain circuits were "collared" open. For maintenance purposes circuit breakers would be grouped on the screen by system function so that one could de-power the proper breakers from the screen to facilitate a maintenance action. There could be remote data bus access ports from which a mechanic with a portable display could plug into the data bus near a major load center he was working on (wheel well for instance) and monitor/control the circuit breakers as well as review any maintenance messages.

Appendix

The following attached APPENDIX reviews in further detail a description of the present AIRCRAFT ELECTRICAL POWER DISTRIBUTION SYSTEM and includes CONCLUSIONS and a list of ACRONYMS.

Introduction

Figure 1:
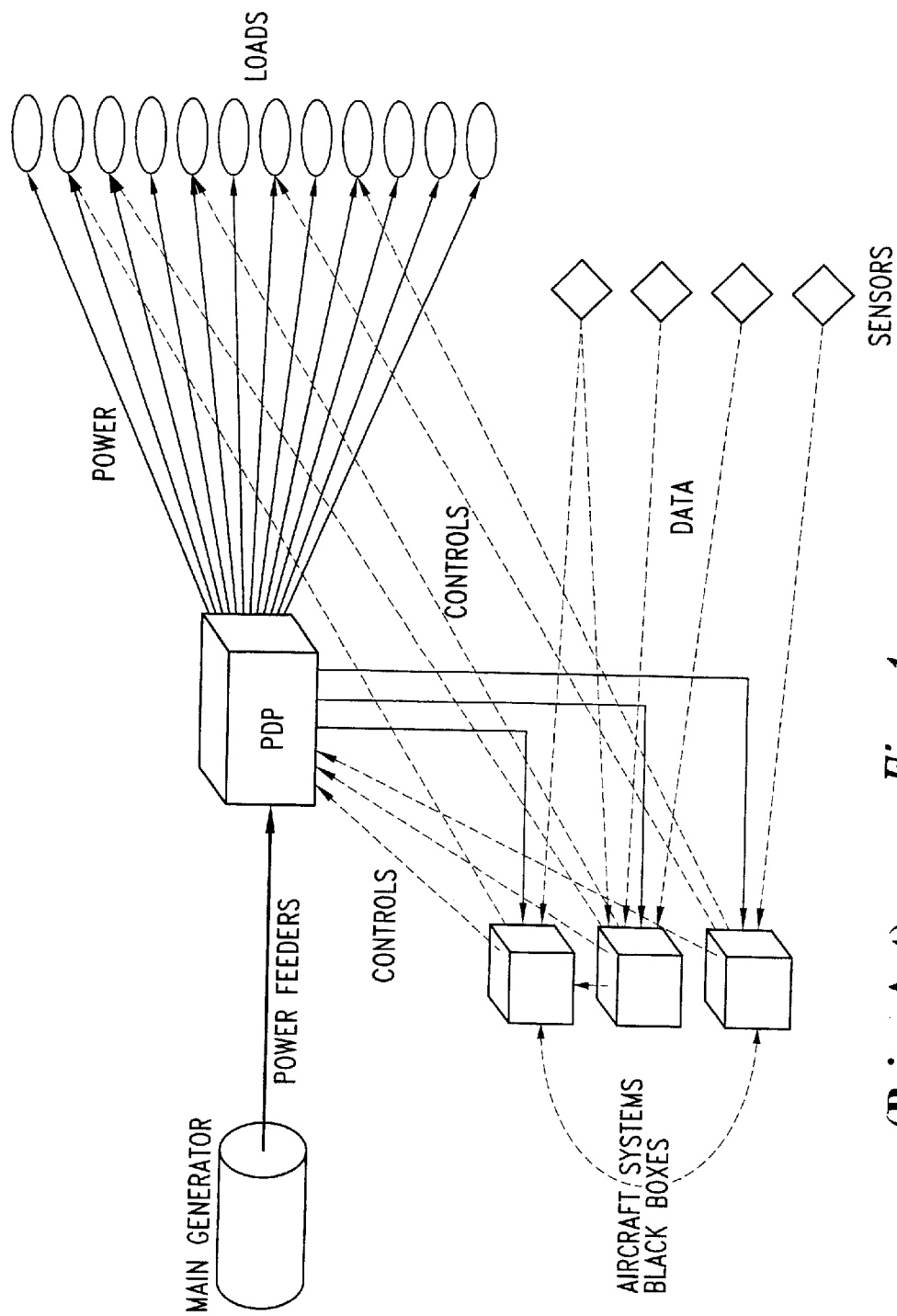
FIG. 1 is the depiction of a conventional aircraft distribution system.

A conventional aircraft distribution system is depicted in FIG. 1. Electrical power from engine mounted generators is fed to a main power distribution panel (PDP), generally in a forward E/E bay, which is co-located with the system controllers. Electrical power is then distributed from these Main power distribution panels to all the load equipment in the aircraft. Data sources are hardwired from sensors (temperature, pressure, position and discretes) all around the aircraft to the System controllers in the E/E bay. Load control signals are hardwired from system controllers in the E/E bay to the individual loads that need to be controlled. This system results in large complex wire bundles, which run the length of the airplane in some cases.

This paper describes an architecture of aircraft electrical power/data distribution designed to minimize and simplify electrical wiring on aircraft and it's installation effort. The proposed architecture is shown in FIG. 2. The system can be subdivided into a data collection network and an electrical power distribution network.

Distribution Architecture

The data collection system utilizes remote data concentrators (RDC), which collect data from geographic areas of the aircraft and transmit that information on a bus for use by various system controllers on the aircraft. For instance flap position information is sent to an electronic unit which acts on that information. If the flap lever is selected to deploy to flaps to some position the electronic unit will command the flaps to the desired position.

Electrical power on the aircraft is transmitted from engine generators to centrally located Main Power Distribution Panels. Secondary feeders distribute the electrical power to small Remote Power Distribution Units (RPDU) which contain solid state power controllers and can be remotely turned off and on in response to data bus commands from the system controllers. The big advantage is the savings in wire weight due to not having to bring sensor data all the way to the system control and not having to distribute all the loads from a single distribution point in the aircraft. By locating these remote data collectors and distribution units geographically close to their source/destinations the aircraft wiring can be greatly simplified and built as part of the aircraft structural sections with mainly power feeds and data bus wiring going across structural joins.

System Configuration

FIG. 3 depicts the Remote Data Concentrator network. The network consists of RDCs, which are located about the aircraft geographically close to the data sources (sensors, discretes, transducers etc.). The sensor data is digitized and broadcast on to a system data bus to be used by any other system. Lightning protection is minimized due to the reduced wire lengths from the sensors in lightning strike areas to the RDCs. The RDCs are geographically close to the sensors they are connected to. Sensor information wiring need no longer be run all the way from the sensors to the system controllers. The savings in wire weight, wire bundle size and associated manufacturing complexity can be realized whether federated system controllers are utilized or an Integrated Modular Avionics (IMA) concept is used. The IMA concept uses generic I/O and Microprocessor modules in a cabinet to control multiple systems. A notional RDC is depicted in FIG. 4. All RDC's could be identical and unique addresses of their data established through exterior program wiring of an RDC.

FIG. 5. illustrates the electrical power distribution network. The electrical power distribution network consists of centrally located Power Distribution Panels (PDP), Remote Power Distribution Units (RPDU), and a Circuit Breaker Control and Status (CBCS) display. All of these units are connected to a high-speed data bus from which system/manual control commands are received/executed.

The Power Distribution Panels are located centrally in the airplane and distribute electrical power to remotely located RPDUs, which are geographically located around the airplane in close proximity to the electrical load equipment.

A Power distribution panel (shown in FIG. 6) would contain the Main Generator breakers and primary Distribution Buses. They would ideally be located within the pressurized fuselage near the leading edge of the wings to reduce the length of the engine generator feeders. There would be one power distribution panel for each engine generator channel. Each Power Distribution Panel would consist of: Main generator control breakers, Bus Tie Breakers, Bus bar network and controllable Distribution breakers to feed electrical power to Remote Power Distribution Units. The PDPs would be connected to a high-speed data bus network to receive control commands and transmit status. All PDPs would be identical and there would be one PDP for each independent channel within the airplane. The airplane channel identifier would be established by program wiring within the airplane connecting to the PDP. All PDPs across the aircraft family could utilize a single part number with minimal weight penalty to a lower capacity member of the family. PDPs would have unique airplane load equipment tables loaded into NVM memory for a particular channel such that all load circuit breaker connectivity information needed by RPDUs would be read by the RPDU at the time the units were powered up. Remote Power Distribution Units receive power from the Main PDPs and distribute power to individual load equipment. RPDUs are placed in the airplane geographically close to the load equipment they control and supply. An RPDU (shown in FIG. 7) would be a shoebox-sized unit consisting of several circuit cards. Most of the circuit cards would have several Solid State Power Controllers (SSPC) mounted on the card. Two cards would be for redundant data bus communication and SSPC control with respect to data bus commands. SSPCs would offer conventional circuit wire protection, arc fault protection, and additionally would provide load on/off control in response to system commands via the databus. Remote trip reset and circuit "collaring" could also be accomplished by data bus command. As the same SSPC package can handle a range of currents, a higher capacity device would be standard and the devices would be programmed by download of circuit information for a RPDU in a certain geographic location. The RPDUs require no active cooling. An RPDU would be automatically reconfigured for an individual SSPC failure such that device failure would not result in flight delays and maintenance could be accomplished at the first convenient maintenance opportunity. Each RPDU will be powered from one electrical bus (Left Main, Right FIG. 6. Power Distribution Panel (PDP) Main, etc.). This will simplify electrical separation requirements. The RPDU will be in communication to the system by data bus so that electrical power will be connected or removed from the individual loads as commanded from the system controller. By locating the RPDU near the load, aircraft wiring will be minimized. RPDUs would be located in each of the major airplane sections. More RPDUs would be located where there is a higher concentration of loads. This could minimize the wiring being routed across major aircraft sections to: power feeders supplying the RPDUs and the data bus wiring. All RPDUs would be identical, and there would be as many RPDUs in each electrical channel as required to supply all load equipment for that channel. The RPDUs would have common part numbers across the aircraft family The CBCS (FIG. 8) is a display unit located in the Electronics bay with another unit possible located in the airplane cockpit. The function of this unit will be to review circuit breaker status (Open, Closed, Tripped), to remotely set tripped circuits and to remotely de-power and collar electronic circuit breakers for maintenance purposes such as remove and replacing load equipment. The cockpit unit would be used to provide status/reset capability to some set of loads, which are deemed to need to be reset in the event of a trip in flight. On the ground they would provide the same interface as the unit located in the electronics bay. For dispatch purposes one could call up a page to verify that all breakers were engaged and circuit protection was operative or that certain circuits were "collared" open. For maintenance purposes circuit breakers would be grouped on the screen by system function so that one could de-power the proper breakers from the screen to facilitate a maintenance action. There could be remote data bus access ports from which a mechanic with a portable display could plug into the data bus near a major load center he was working on (wheel well for instance) and monitor/control the circuit breakers as well as review any maintenance messages.

The benefits this advanced distribution system will provide over conventional distribution systems include: Reduced aircraft wiring, Reduced shielding length requirements, simpler physical separation for meeting system separation requirements and easier build and repair of aircraft wiring during manufacturing or repair.

Components

Remote Data Concentrators are depicted in FIG. 4. The mix and type of analog signals would be decided early on by a systems team such that most all-analog data types would be standardized. Sensors for a new family of systems would be required to conform to the standards. The RDC would take the analog data, and broadcast the scaled data on the data bus along with the input address (input pins from which data came) and the RDC address (Physical wiring pins which identify one RDC location from another) to give each sensor a unique address.

Figure 6:
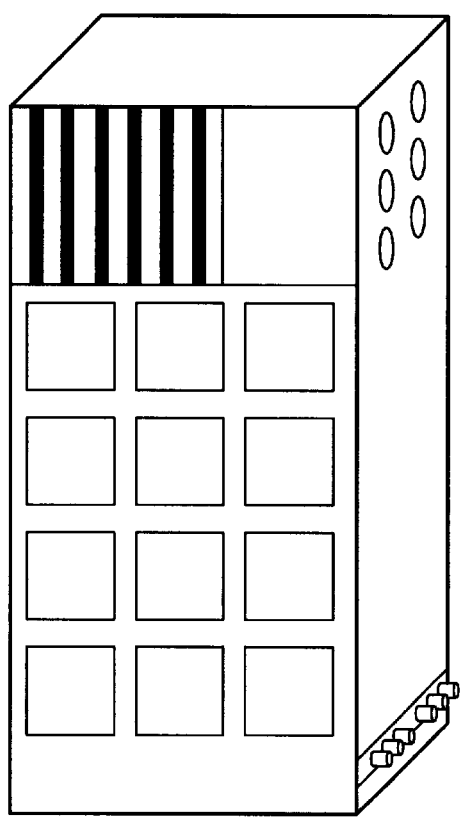
FIG. 6 depicts a power distribution panel.

Main Power Distribution Panels (PDP) are illustrated in FIG. 6. The panels house high capacity (Generator Circuit Breaker, Bus-Tie-Breaker) and medium capacity (RPDU feeds) contactors. They would utilize molded busbars to connect electrical power circuits in a safe and volume efficient manner. They would be connected to the System data buses to receive control inputs and to broadcast system status. Load connectivity data for individual airplane loads would be loaded into memory of the PDP. Upon power up RDPUs would read their load connectivity from the PDP allowing the RPDU to directly control electrical power to individual loads.

Figure 7:
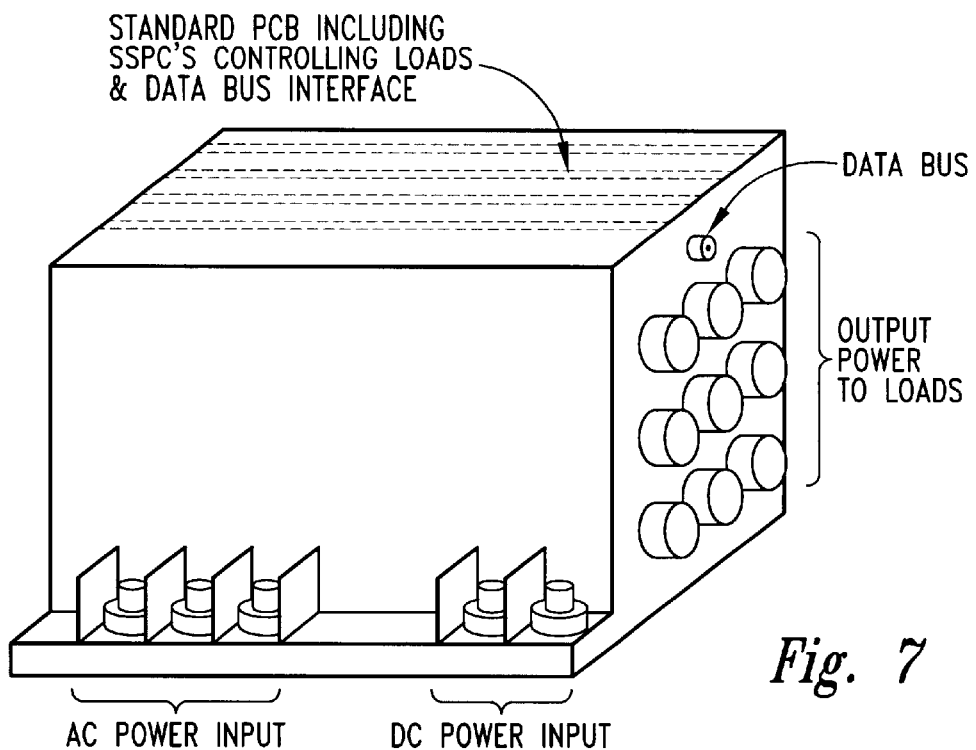
FIG. 7 shows an RPDU.

Remote Power Distribution Units (RPDU) illustrated in FIG. 7 are at the center of the distribution system. These units are envisioned to be about the size of a shoebox populated with several circuit cards containing perhaps 6 to 8 Solid State Power Controllers each. Two cards would be for redundant dedicated System Data bus communications.

Figure 8:
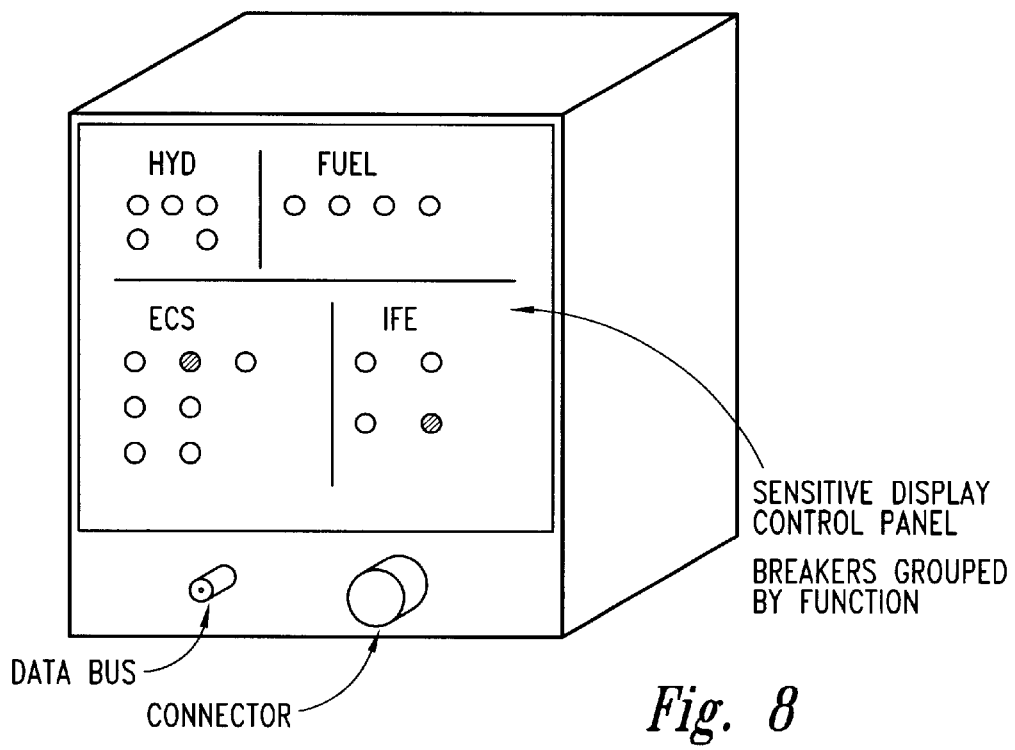
FIG. 8 shows the CBCS display unit.

Circuit Breaker Control and Status Display (CBCS), illustrated in FIG. 8 would normally provide status information on electronic circuit breaker state (Open/Closed). One would be located in the electronics bay to facilitate maintenance of the aircraft. A display in the cockpit could utilize an existing display to allow reset of the subset of circuits required to be reset in flight.

Ideally the architecture for the data concentration and electrical power distribution networks is developed by joint aircraft and supplier teams. Specifications for the individual components are accomplished through ARINC Standards.

Conclusion

The remote Data Concentrator network used in conjunction with the Remote Power Distribution network would greatly reduce aircraft wiring length, weight complexity and installation cost. Aircraft Structural sections could be wired prior to section joins with only a small number of wires required to go across structural joins. This would result in significantly reduced installation time during integration assembly thus reducing manufacturing costs. The aircraft wiring system would also now be easier to repair and troubleshoot, lowering airline maintenance costs. A large number of the individual components of this integrated system would be identical across the aircraft family allowing for reduced spares holding costs for the airlines.

Acronyms

CBCS Circuit Breaker Control and Status
E/E Electronic Equipment
IMA Integrated Modular Avionics
PDP Power Distribution Panel
RDC Remote Data Concentrator
RPDU Remote Power Distribution Unit
SSPC Solid State Power Controller

What is claimed is:

1. An aircraft electrical power distribution network comprising in combination:
    a data collection network including a plurality of sensors;
    an electrical power distribution network;
    said data collection network comprising a plurality of data concentrators (RDC);
    a plurality of system controllers;
    said data collection network comprising said data concentrators collecting sensor data from various locations in the aircraft and transmitting said data on a bus for utilization by said plurality of system controllers; and
    said data concentrators responsive to analog data and broadcasting scaled data on said bus with input address and RDC address thereby providing each of said plurality of sensors with a unique address.

2. A method of configuring an electrical power distribution system topology for a particular airplane configuration from a plurality of configurations comprising the steps of:
    providing at least one generating means;
    providing a main electrical power distribution panel for each of said power generating means;
    providing remote power distribution unit located near the center of electrical load equipment for each of said power distribution panels;
    providing at least one data communication network between said power distribution panel and said remote power distribution units and, each of said power distribution panels housing high capacity and medium capacity RPDU feeds contractors and a memory for loading load connectivity data for individual airplane loads whereupon power up RPDU reads load connectivity from the power distribution panel thereby allowing the RPDU to directly control electrical power to individual loads.

3. An electrical power distribution network in an aircraft comprising in combination:
    a plurality of power distribution panels (PDP);
    each of said power distribution panels housing high capacity and medium capacity RPDU feeds contractors and a memory for loading load connectivity data for individual airplane loads whereupon power up RPDU reads load connectivity from the power distribution panel thereby allowing the RPDU to directly control electrical power to individual loads;
    a plurality of remote power distribution units (RPDU);
    a circuit breaker control and status display (CBCS);
    said plurality of power distribution panels (PDP), said plurality of remote power distribution units (RPDU), and said circuit breaker control and status display (CBCS) connected to a high-speed data bus for receiving and executing system/manual control commands.

4. In combination in an electrical power distribution network:
    a plurality of power distribution panels PDP) located centrally in an aircraft for distributing power to remotely located remote power distribution units (RPDU) located around the aircraft in close proximity to electrical load equipment;
    each of said power distribution panels (PDP) comprising main generator breakers and primary distribution buses;
    said power distribution panels (PDP) located within the pressurized fuselage near the leading edge of the wings of the aircraft to reduce the length of the engine generator feeders;
    one of each of said power distribution panels associated with each engine generator channel;
    each of said power distribution panels (PDP) comprising main generator control breakers, bus tie breakers, a bus bar network and controllable distribution breakers to feed electrical power to said remote power distribution units (RPDU);
    said power distribution panels (PDP) connected to a high-speed data bus network to receive control commands and transmit status; and,
    each independent channel within the aircraft comprising a single identical power distribution unit (PDP).

5. The invention according to claim 4 wherein said remote power distribution units (RPDU) comprise several circuit cards including a plurality of solid state power controllers (SSPC) mounted on the card, two of said cards providing redundant data bus communication and (SSPC) control with respect to data bus commands, and each of said remote power distribution units (RPDU) powered from one electrical bus.

* * * * *